Feb. 14, 1967  T. N. HULL, JR  3,303,653
LIGHTWEIGHT THRUST REVERSER
Filed June 30, 1965  2 Sheets-Sheet 2
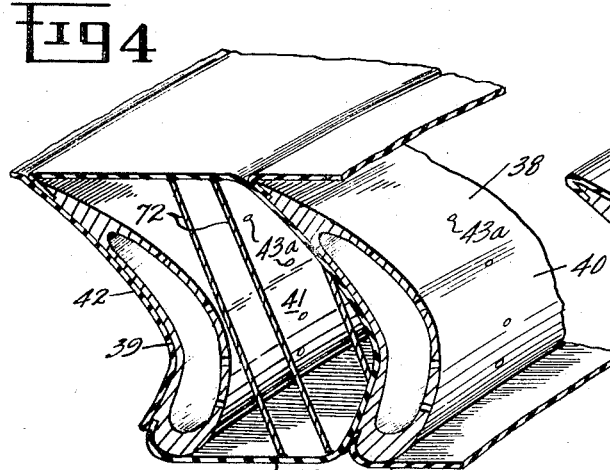
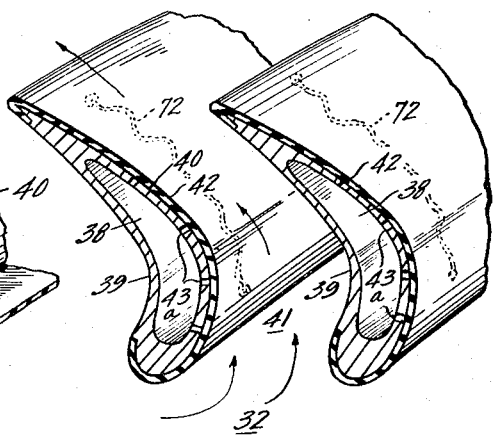
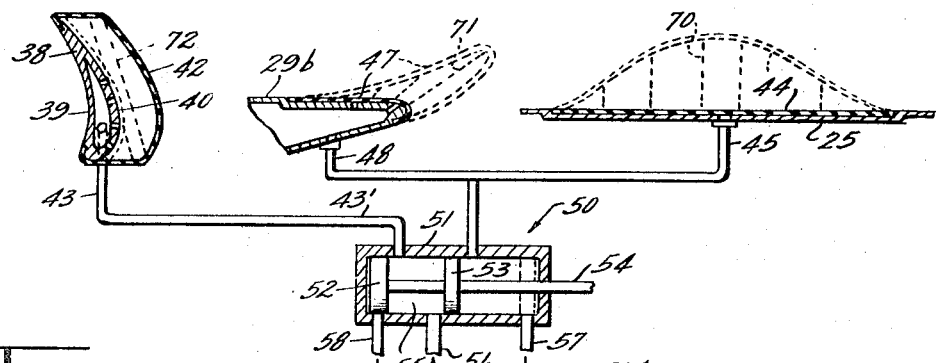
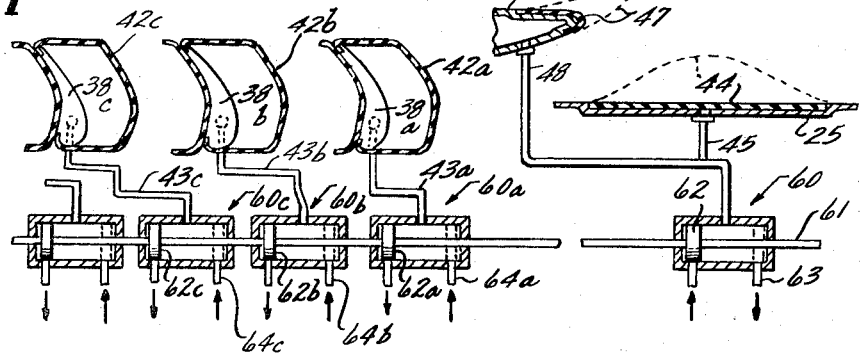
INVENTOR.
THOMAS N. HULL, JR.
BY
George R. Powers
ATTORNEY United States Patent Office 3,303,653
Patented Feb. 14, 1967

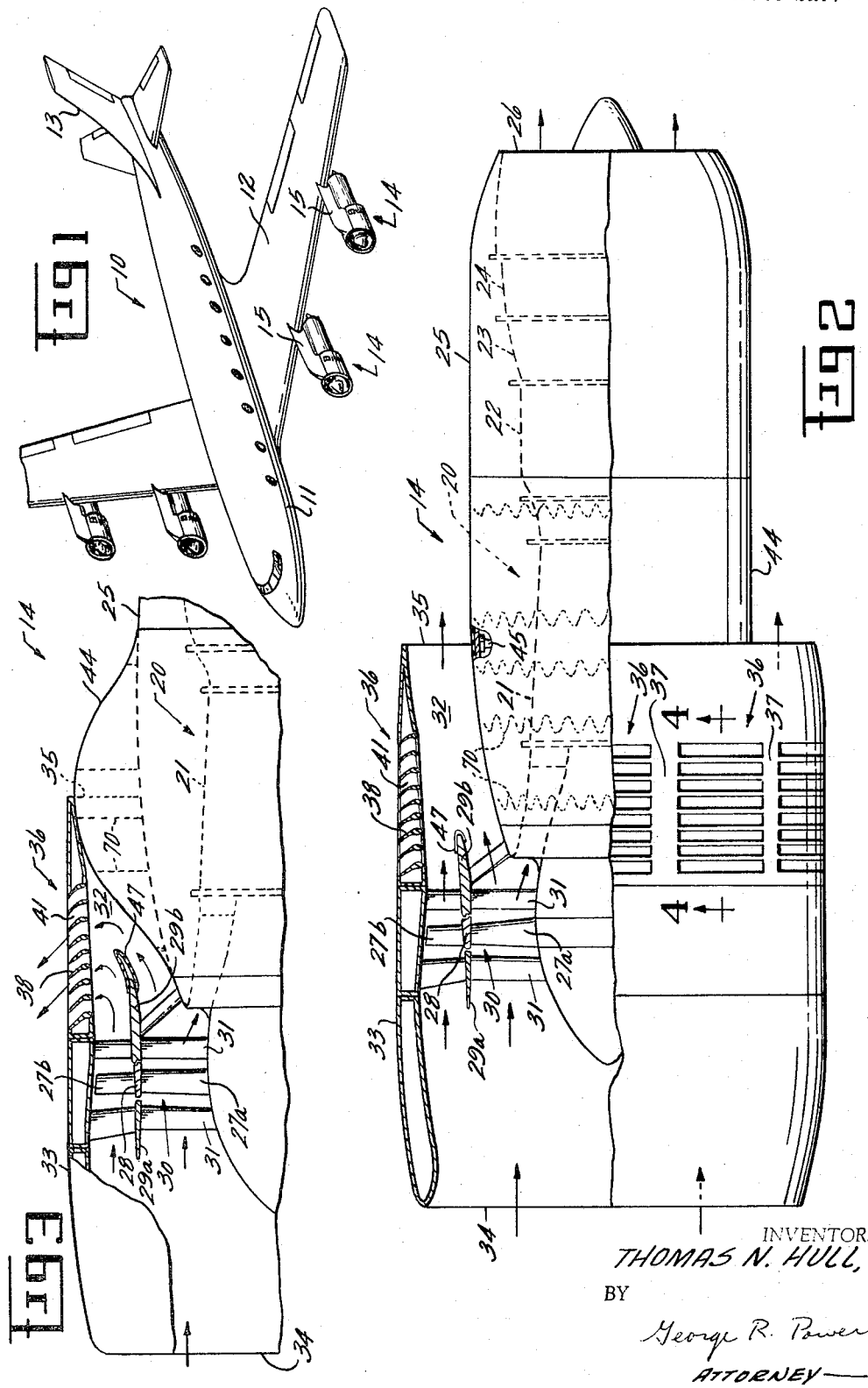

3,303,653
LIGHTWEIGHT THRUST REVERSER
Thomas Neil Hull, Jr., Marblehead, Mass., assignor to General Electric Company, a corporation of New York
Filed June 30, 1965, Ser. No. 468,299
9 Claims. (Cl. 60—229)

This invention relates to thrust reversers and, more particularly, to lightweight thrust reversing means especially suited for use with jet propulsion units of the fan or high by-pass ratio type.

In jet propelled aircraft, it is extremely desirable that effective and dependable means be provided for reversing the propulsion stream under certain conditions to thereby produce reverse thrust on the aircraft. During landing, thrust reversing may be used to bring the aircraft to a rapid halt without requiring the use of mechanical braking systems. Similarly, a take-off may be aborted at the last possible moment and the aircraft brought to a quick and safe stop through the use of thrust reversers. There are several obvious advantages in the use of thrust reversers. First of all, an effective thrust reverser acting in conjunction with the aircraft braking system can stop an aircraft in a much shorter distance than even the most effective mechanical braking arrangements acting alone; consequently, the aircraft may operate from much shorter runways. The use of thrust reversers thus extends the operational capability of both the aircraft and existing airfields as well as permitting the construction of new runways of minimum length at great savings in expense, time and effort. Secondly, thrust reversers, which typically have essentially static components for reversing the jet stream, do not rely on the fractional dissipation of great quantities of energy for bringing the aircraft to a stop. As a result, the use of thrust reversers extends the operating life of certain aircraft components such as brake linings and tires.

With the modern trend in aircraft design toward larger and heavier aircraft, the need for effective thrust reversing is assuming ever increasing importance. This growing need is complicated, however, by another design trend relating to physical size of aircraft powerplants. More particularly, to provide the extremely high thrust required to propel large aircraft, various fan and high bypass ratio powerplants are being proposed and used. This type of powerplant, which extracts a portion of the energy present in the hot gas stream for accelerating a large volume of bypass air, is characterized by a relatively large jet stream diameter and relatively cool jet gases. The enlarging of state-of-the-art reversers for use on such power-plants may not be entirely satisfactory since the weight of such a thrust reverser will ordinarily increase at greater rate than its diameter as it is scaled up in size. Furthermore, in view of its weight, the loads exerted on its elements during operation, and other factors, it is desirable that a thrust reverser used with such large powerplants be relatively simple and straightforward in design and operation. Finally, a satisfactory thrust reverser should not add significantly to the total aircraft drag during aircraft operation; in particular, the thrust reversing mechanism should not add to the already large diameter of a fan type propulsion unit.

It is, therefore, an object of this invention to provide improved lightweight thrust reversing means.

Another object of this invention is to provide improved thrust reversing means for use with jet propulsion powerplants of the fan type.

A further object is to provide for jet propulsion powerplants of the fan or high bypass ratio type thrust reversing means that is relatively simple and straightforward in both design and operation.

A still further object is to provide for use with large diameter jet propulsion powerplants thrust reversing means that does not increase the overall powerplant diameter.

Yet another object of this invention is to provide lightweight thrust reversing means that is relatively inexpensive to manufacture, install and maintain.

Briefly stated, in carrying out the invention in one form, lightweight thrust reversing means is provided for deflecting a stream of motive fluid discharged by a jet propulsion powerplant of the fan type. The thrust reverser of this invention utilizes first and second expansible means for selectively opening and closing alternate motive fluid passages to thereby control the direction of motive fluid flow and the direction of thrust produced by the powerplant. Moreover particularly, in accordance with an illustrated embodiment of the invention, the powerplant casing is provided with a cascade of axially spaced, circumferentially extending turning vanes which cooperate to form a plurality of channels between the motive fluid passageway within the casing and the exterior of the powerplant, the vanes being disposed such that motive fluid flowing through the channels is discharged with a substantial upstream component of velocity relatively to the normal downstream direction of flow in the passageway. A first expansible means is associated with the turning vanes, the first expansible means having an inflated position preventing flow through the channels and a deflated position permitting flow through the channels. A second expansible means is associated with the normal outlet opening from the motive fluid passageway, the second expansible means having an inflated position preventing flow through the outlet opening and a deflated position permitting flow through the outlet opening. By simultaneously inflating the first expansible means and deflating the second expansible means, motive fluid may be discharged through the outlet opening to produce forward thrust; and by simultaneously deflating the first expansible means and inflating the second expansible means, motive fluid may be discharged through the channels to produce reverse thrust.

By a further aspect of the invention, the first expansible means is comprised of a plurality of elastic diaphragms each mounted on the convex surface of a respective one of the turning vanes, and the second expansible means is an elastic diaphragm mounted adjacent the outlet opening. The elastic diaphragms may be provided with restraining members for controlling their inflated shapes. By a still further aspect of the invention, expansible guide means is provided for directing the motive fluid to either the outlet opening or the channels, depending upon the positioning of the first and second expansible means. Also in accordance with the invention, a plurality of turning vanes cascades may be provided, each cascade having independent means for inflating and deflating the elastic diaphragms associated therewith.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a plan view of an aircraft powered by fan type powerplants supported from the aircraft wings and employing the thrust reversing means of this invention;

FIG. 2 is a view, partially in cross-section, of one of the jet propulsion powerplants of FIG. 1, the thrust reversing elements being positioned in their inactive locations such that forward thrust is produced by the powerplant;

FIG. 3 is a partial view of the powerplant of FIG. 2 in which the thrust reversing elements are positioned to produce reverse thrust;

FIG. 4 is a fragmentary perspective view of a cascade of vanes and the elastic diaphragms associated therewith, the diaphragms being illustrated in their inflated positions;

FIG. 5 is a view similar to FIG. 4 showing the elastic diaphragms in their deflated positions;

FIG. 6 is a schematic view of a suitable control valve mechanism for inflating and deflating the expansible thrust reversing elements; and FIG. 7 is a schematic view of a valve mechanism for independently inflating the elastic diaphragms of each cascade of vanes.

Referring first to FIG. 1, an aircraft indicated generally by the numeral 10 is illustrated, the aircraft 10 having an airframe including a fuselage 11, a pair of wings 12, and a tail section 13. A pair of jet propulsion powerplants 14 of the front fan type are symmetrically mounted on each wing 12 by pylon structures 15. While the specific configuration and operation of the front fan powerplants 14 will be explained in detail at a later point in this specification, it will be well to point out at this time that powerplants of the fan type have relatively large diameters and are designed to produce relatively high thrust. Such powerplants are therefore especially suited for propelling large and heavy aircraft. More particularly, jet propulsion powerplants of the fan type produce two streams of motive fluid for propelling the associated aircraft. In a front fan powerplant of the type illustrated, the streams comprise an inner stream of high temperature, low density combustion products and an outer stream of low temperature, high density bypass air surrounding the stream of exhaust gases. In fan type powerplants having a sufficiently high bypass ratio the bulk of the thrust is produced by the bypass stream; in such arrangements, thrust reversing can be effected by providing means for deflecting only the stream of bypass fluid. In accordance with the present invention, lightweight thrust reversing means are provided for deflecting a stream of motive fluid, the means being particularly suited for deflecting the stream of bypass air in a front fan powerplant.

Attention is now directed to FIG. 2 where one of the front fan powerplants 14 is illustrated in greater detail. Each powerplant 14 includes an inner turbomachine 20 which is essentially a turboshaft engine in that it includes a compressor 21, a combustor 22, a gas generator turbine 23 for driving the compressor 21, and a power turbine 24 arranged in axially spaced, serial flow relationship. This inner turbomachine, or jet engine 20, is enclosed within a cylindrical wall 25 which terminates at its downstream end in an exhaust nozzle 26 through which the combustion products may be discharged to produce thrust. In order to provide additional thrust, a fan 30 is mounted upstream of the jet engine 20 and is driven by the power turbine 24, the fan 30 having inner and outer compresor blades 27a and 27b, respectively, which extend radially outward of the wall 25 across a bypass duct or passageway 32 defined between an outer cylindrical casing 33 and the jet engine wall 25, the blades 27a and 27b being interconnected by platforms 28. The platforms 28 are aligned with stationary shroud members 29a and 29b carried by stator vanes 31 extending radially inward from the casing 33. It will thus be noted that air drawn through the inlet opening 34 at the upstream end of the casing 33 is accelerated by the fan 30, after which a portion of the air passing through the inner blades 27a is supplied to the jet engine 20 to support combustion therein. The remainder of the air flows through the bypass passageway 32 from which it is normally discharged in the axially downstream direction through an outlet opening 35. The powerplant 14 is a high bypass ratio machine; by the term "high bypass ratio" it is meant that the ratio of mass flow of motive fluid in the bypass passageway 32 to mass flow in the jet engine 20 is high. Since a substantial amount of energy is extracted from the combustion gases in driving the power turbine 24 (except for losses, this energy is transferred to the bypass stream as the air is accelerated by the fan 30), it will occur to those skilled in the art that the major portion of the total thrust is provided by the bypass stream of air. The novel thrust reversing arrangement for deflecting this bypass stream of motive fluid will now be described.

With reference still being directed to FIG. 2, a plurality of openings 36 are provided in the casing 33. The openings 36, preferably six in number, extend about as much of the periphery of the casing 33 as possible, webs 37 being provided between adjacent openings 36 to maintain the structural integrity of the casing 33. A cascade of axially spaced, circumferentially extending turning vanes 38 is located in each of the openings 36, the cascade being illustrated in greater detail by FIGS. 4 and 5. As illustrated therein, the vanes 38 have upstream concave surfaces 39 and downstream convex surfaces 40 such that channels 41 are defined between adjacent pairs of vanes. An elastic diaphragm 42 is mounted on the convex surface 40 of each vane 38, and a conduit 43 (see FIG. 6) supplies pressurized fluid to the underside of the elastic diaphragm through the interior of the vane and openings 43a. With the edges of the diaphragm 42 secured to the vane 38 in a fluid tight manner, the diaphragm may be inflated and deflated in a manner hereinafter described. When the diaphragms 42 are inflated as shown by FIG. 2 and by FIG. 4, the diaphragms 42 extend completely across the channels 41 to abut the adjacent vane's concave surface 39 and thereby prevent flow of motive fluid through the channels 41. However, in the deflated positions, as shown by FIG. 3 and by FIG. 5, the diaphragms 42 are contiguous with the convex surfaces 40 and thereby permit substantially unimpeded flow of motive fluid through the channels 41.

To prevent flow of bypass air through the outlet opening 35, an elastic diaphragm 44 is provided adjacent the opening 35. The diaphragm 44 extends peripherally about the engine wall 25 and is secured thereto at its upstream and downstream ends in a fluid tight manner, a conduit 45 being provided for supplying pressurized fluid to the underside of the diaphragm 44. When the diaphragm 44 is inflated as shown in FIG. 3, it extends completely across the bypass passageway 32 to abut the casing 33 and thereby prevent flow of motive fluid through the outlet opening 35. In its deflated position as illustrated by FIG. 2, the diaphragm 44 is contiguous with the wall 25 so as to not interfere with the flow of bypass air.

Another diaphragm 47 is mounted on the downstream end of the annular shroud member 29b in a fluid tight manner, a conduit 48 (see FIG. 6) being provided for supplying pressurized fluid to the underside of the diaphragm 47. When the diaphragm 47 is inflated as shown by FIG. 3, it acts as a guide means for turning the bypass air toward the channels 41. In its deflated position shown by FIG. 2, the diaphragm 47 is contiguous with the shroud member 29b so as to provide no turning.

The operation of the thrust reversing mechanism will now be described. During normal flight when forward thrust is desired, the diaphragms 42, 44 and 47 are positioned as illustrated by FIGS. 2 and 4. With the diaphragms 42 inflated to block the channels 41 and the diaphragms 44 and 47 deflated, the entire flow of bypass air or motive fluid is discharged through the outlet opening 35 so that the engine operates to produce the required forward thrust. When reverse thrust is required, the diaphragms 42, 44 and 47 are positioned as illustrated by FIGS. 3 and 5. With the channels 41 unobstructed with the diaphragm 47 directing the motive fluid thereto and the outlet opening 35 blocked, the bypass air flows through the channels 41 defined between the vanes 38. These channels formed between the concave and convex surfaces 39 and 40, respectively, of the vanes 38 are disposed such that the bypass air discharged therefrom to the exterior of the casing 33 has a substantial upstream component of velocity relative to the normal downstream direction of flow in the bypass passageway 32; in other words, the bypass stream is turned substantially as it flows through the vanes cascades. In being turned, the motive fluid exerts a substantial rearward force on the concave surfaces 39 of the vanes 38, this reverse thrust being, of course, transmitted through the casing 33 and the pylon structure 15 (see FIG. 1) to the aircraft 10.

As just described, all of the diaphragms 42 are inflated and deflated in unison. Furthermore, the diaphragms 42 are inflated when the diaphragms 44 and 47 are deflated, and vice versa. A schematic illustration of a suitable control valve mechanism 50 for accomplishing this is illustrated by FIG. 6, the mechanism including a valve housing 51 having two spaced apart pistons 52 and 53 therein. The two pistons 52 and 53 are secured to an actuating rod 54 which extends outwardly through the housing 51. Through suitable means not illustrated, the pilot can move the actuating rod 54 to position the pistons 52 and 53 in either the forward thrust position illustrated by solid lines in FIG. 5 or the reverse thrust position illustrated by broken lines. With the pistons 52 and 53 in the forward thrust position, pressurized fluid from a suitable source such as the compressor 21 of the inner jet engine 20 is supplied to the interior cavity 55 of the valve housing 51 through a conduit 56. The pressurized fluid is transmitted from the cavity 55 to each of the diaphragms 42 (one only being illustrated) through an outlet conduit 43' to which the conduit 43 of each diaphragm 42 is connected. As a result, each diaphragm 42 is inflated to block the associated channel 41. At the same time, the piston 53 prevents pressurization of the diaphragms 44 and 47 which are vented through conduits 45, 48 and 57 to a drain such as atmosphere. With the pistons 52 and 53 in the reverse thrust position, the pressurized fluid inflates the diaphragms 44 and 47 while the diaphragms 42 are vented to atmosphere through conduit 58.

As pointed out previously, the diaphragms 42 should be inflated at all times during normal forward flight. If for some reason all of the diaphragms 42 should deflate when thrust reversing is not desired, the reduction in thrust could cause substantial difficulties. Such a condition could occur, for example, if one of the diaphragms were to rupture and thereby cause loss of pressure in the entire system. A control valve arrangement for preventing such undesired deflation of all of the diaphragms 42 is illustrated by FIG. 7. In FIG. 7, turning vanes 38a, 38b, and 38c are illustrated, each of these vanes representing all of the vanes of a respective one of the cascades. The diaphragms 42a, 42b, and 42c associated with these vanes are inflated and deflated through conduits 43a, 43b, and 43c leading to control valve housings 60a, 60b, and 60c, respectively. In practice, there are as many housings as there are cascades. A similar housing 60 is connected to the diaphragms 44 and 47 by conduits 45 and 48. A common actuating rod 61 extends through all of the housings, the rod 61 having control pistons 62, 62a, 62b, and 62c mounted thereon. In the forward thrust positions illustrated by solid lines, the diaphragms 44 and 47 are vented to atmosphere through conduits 45, 48 and 63 while the diaphragms 42a, 42b and 42c are inflated through conduits 64a and 43a, 64b and 43b, and 64c and 43c, respectively. Each of the conduits 64a, 64b, and 64c are connected to an independent source of pressure. Since the pressure is transmitted to the diaphragms 42a, 42b, and 42c through independent housings and independent conduits 43a, 43b, and 43c, it will be clear that a failure in one cascade will affect only that cascade of vanes. Accordingly, while the undesired deflation of the diaphragms of one cascade would reduce thrust, the reduction would not ordinarily reach a dangerous level. In the reverse thrust positions illustrated by broken lines, the diaphragms 42 are deflated and the diaphragms 44 and 47 are inflated; the manner in which this occurs will be obvious from the previous description of the control arrangement of FIG. 6.

As discussed heretofore, the diaphragms 42 are desirably inflated and deflated in unison, and the diaphragms 42 are inflated when the diaphragms 44 and 47 are deflated, and vice versa. It will occur, however, to those skilled in the art that under certain circumstances other arrangements may be desirable. For example, the power plant 14 has a normal operating range which includes a minimum thrust level. To go below this minimum level without reversing thrust could be easily accomplished by deflating a portion of the diaphragms 42 while leaving the outlet opening 35 open. This and other modifications which will occur to those skilled in the art can be provided by modifying the valve arrangement slightly.

The expansible diaphragms 42 and 44 can be formed from any rubber-like material, provided that the material is sufficiently elastic to permit expansion thereof under the application of a high pressure fluid and to permit rapid resumption of its unstretched condition upon the elimination of the pressure. Such elastic materials can be used since the diaphragms are only exposed to the relatively cold bypass air in the bypass passageway 32 and not to the hot combustion products discharged through the exhaust nozzle 26.

In the foregoing description, the diaphragms 42 and 44 have been described as having inflated and deflated positions. To control the expanded shapes of the diaphragms, suitable restraining members or cords may be used. With respect to the diaphragms 44 and 47, reference is made to FIGS. 2 and 6 where cords 70 and 71, respectively, are shown extending circumferentially of the diaphragm. While the cords can be attached to the surfaces of the diaphragms, a preferred form is to have the cords embedded within the diaphragms. The cords 70 and 71, which are flexible and inelastic, assume the serpentine shapes when the diaphragms are deflated. The diaphragms 44 and 47 can be expanded until the cords 70 and 71 are tensioned and assume the positions illustrated by FIG. 6. Various ones of the cords 70 and 71 have unequal extended lengths. As a result, any desired aerodynamic inflated shapes of the diaphragms 44 and 47 may be obtained by proper choice of extended lengths of the cords 70 and 71. As illustrated by FIGS. 4 and 5, similar cords 72 may be embedded in the diaphragms 42 for controlling the inflated shapes of the diaphragms 42.

While the thrust reversing means of this invention has been shown and described in a jet propulsion powerplant 14 of the front fan type mounted on an aircraft wing, it will be obvious that the thrust reversing means may be used with fuselage mounted powerplants and that it may be used in conjunction with other arrangements of turbomachinery. For example, the arrangement may be used in conjunction with cruise fan engines and aft fan engines since these powerplants have relatively low temperature motive fluid streams which will not adversely affect thet expansible diaphragms. It is, of course, understood that the term "low" is relative to normal temperatures associated with jet propulsion powerplants.

From the foregoing, it will be appreciated that the lightweight thrust reversing means of this invention is particularly suited for use with jet propulsion powerplants having a low temperature motive fluid stream. Furthermore, the lightweight thrust reverser described above is relatively simple and straightforward in design and operation, and it does not increase either the over-all powerplant diameter or aircraft drag during aircraft operation.

While particular embodiments of the invention have been shown and described, it will be understood that various changes and modifications may be made without

What is claimed as new and is desired to secure by Letters Patent of the United States is:

1. In a jet propulsion powerplant of the fan type having an inner jet and a fan driven by the jet engine, thrust reversing means comprising:

a cylindrical wall enclosing the inner jet engine, the fan extending radially outward of said wall, a cylindrical casing surrounding the fan and spaced from said engine wall to form therewith an axially extending bypass passageway for the flow of motive fluid between inlet and outlet openings at opposite ends of said casing, a plurality of thrust reversing cascades each comprising a plurality of axially spaced turning vanes extending circumferentially about an arcuate portion of said casing, said turning vanes having upstream concave surfaces and downstream convex surfaces to define therebetween a plurality of channels extending through said casing for the flow of motive fluid therethrough from said passageway to the exterior of said casing, a plurality of sets of first elastic diaphragms, each set being associated with a respective one of said cascades and comprising a plurality of diaphragms each mounted on the convex surface of a respective one of said turning vanes, said first elastic diaphragms having inflated positions extending across said channels for preventing flow of motive fluid through said channels and deflated positions contiguous with said convex surfaces for permitting flow of motive fluid through said channels, a second circumferential elastic diaphragm carried by said engine wall adjacent said outlet opening, said second elastic diaphragm having an inflated position extending across said axial passageway for preventing flow of motive fluid through said outlet opening and a deflated position for permitting flow of motive fluid through said outlet opening, and means for inflating and deflating said sets of first elastic diaphragms and said second elastic diaphragm.

2. Thrust reversing means as defined by claim 1 in which said means for inflating and deflating said first and second elastic diaphragms comprises:

a plurality of first inflating means each associated with a respective one of said sets of first elastic diaphragms, second inflating means associated with said second elastic diaphragm, and means for controlling inflation and deflation of said first and second elastic diaphragms by said first and second inflating means.

3. Thrust reversing means as defined by claim 2 in which said control means causes simultaneous inflation of said sets of first elastic diaphragms and deflation of said second elastic diaphragm to exhaust motive fluid through said outlet opening and thereby produce forward thrust, and simultaneous deflation of said sets of first elastic diaphragms and inflation of said second elastic diaphragm to exhaust motive fluid through said channels and thereby produce reverse thrust.

4. In a jet propulsion powerplant, thrust reversing means comprising:

a cylindrical casing surrounding an axially extending passageway for the flow of low temperature motive fluid between inlet and outlet openings at opposite ends of said casing, a cascade of axially spaced turning vanes extending circumferentially about an arcuate portion of said casing, said turning vanes having upstream concave surfaces and downstream convex surfaces to define therebetween a plurality of channels extending through said casing for the flow of motive fluid therethrough from said passageway to the exterior of said casing, a plurality of first elastic diaphragms each mounted on the convex surface of a respective one of said turning vanes, said first elastic diaphragms having inflated position extending across said channels for preventing flow of motive fluid through said channels and deflated positions contiguous with said convex surfaces for permitting flow of motive fluid through said channels, a second elastic diaphragm adjacent said outlet opening, said second elastic diaphragm having an inflated position extending across said axial passageway for preventing flow of motive fluid through said outlet opening and a deflated position for permitting flow of motive fluid through said outlet opening, and means for inflating and deflating said first and second elastic diaphragms.

5. Thrust reversing means as defined by claim 4 including restraining members associated with said diaphragms for controlling the inflated shapes of said diaphragms.

6. Thrust reversing means as defined by claim 4 in which said means for inflating and deflating said first and second elastic diaphragms simultaneously inflates said first diaphragms and deflates said second diaphragms to exhaust motive fluid through said outlet opening and thereby produce forward thrust, and simultaneously deflates said first diaphragms and inflates said second diaphragms to exhaust motive fluid through said channels and thereby produce reverse thrust.

7. In a jet propulsion powerplant, thrust reversing means comprising:

a cylindrical casing surrounding an axially extending passageway for the flow of low temperature motive fluid between inlet and outlet openings at opposite ends of said casing, means forming a plurality of channels through said casing, said channels being disposed such that motive fluid flowing therethrough from said passageway to the exterior of said casing is discharged therefrom with a substantial upstream component of velocity relative to the normal downstream direction of flow into said passageway, first expansible means associated with said channels, said first expansible means having an inflated position for preventing flow of motive fluid through said channels and a deflated position for permitting flow of motive fluid through said channels, seccond expansible means adjacent said outlet opening, said second expansible means having an inflated position for preventing flow of motive fluid through said outlet opening and a deflated position for permitting flow of motive fluid through said outlet opening, and means for inflating and deflating said first and second expansible means, said first expansible means being inflated and said second expansible means being simultaneously deflated to exhaust motive fluid through said outlet opening and thereby produce forward thrust, and said first expansible means being deflated and said second expansible means being simultaneously inflated to exhaust motive fluid through said channels and thereby produce reverse thrust.

8. In a jet propulsion powerplant of the fan type having an inner jet engine and a fan driven by the jet engine, thrust reversing means comprising:

a cylindrical wall enclosing the inner jet engine, the fan extending radially outward of said wall, a cylindrical casing surrounding the fan and spaced from said engine wall to form therewith an axially extending bypass passageway for the flow of motive fluid between inlet and outlet openings at opposite ends of said casing, a cylindrical shroud within said passageway disposed radially inward of said casing, a plurality of thrust reversing cascades each comprising a plurality of axially spaced turning vanes extending circumferentially about an arcuate portion of said casing, said turning vanes having upstream concave surfaces and downstream convex surfaces to define therebetween a plurality of channels extending through said casing for the flow of motive fluid therethrough from said passageway to the exterior of said casing, a plurality of sets of first elastic diaphragms, each set being associated with a respective one of said cascades and comprising a plurality of diaphragms each mounted on the convex surface of a respective one of said turning vanes, said first elastic diaphragms having inflated positions extending across said channels for preventing flow of motive fluid through said channels and deflated positions contiguous with said convex surfaces for permitting flow of motive fluid through said channels, a second circumferential elastic diaphragm carried by said engine wall adjacent said outlet opening, said second elastic diaphragm having an inflated position extending across said axial passageway for preventing flow of motive fluid through said outlet opening and a deflated position for permitting flow of motive fluid through said outlet opening, a third circumferential elastic diaphragm carried by said shroud, said third elastic diaphragm having an inflated position projecting into said axial passageway for directing motive fluid to said cascades and a deflated position contiguous with said shroud for permitting undeflected flow of motive fluid to said outlet opening, and means for inflating and deflating said sets of first elastic diaphragms and said second and third elastic diaphragms.

9. Thrust reversing means as defined by claim 8 in which said means for inflating and deflating said first, second and third elastic diaphragms simultaneously inflates said first diaphragms and deflates said second and third diaphragms to exhaust motive fluid through said outlet opening and thereby produce forward thrust, and simultaneously deflate said first diaphragms and inflate said second and third diaphragms to exhaust motive fluid through said channels and thereby produce reverse thrust.

No references cited.

CARLTON R. CROYLE, *Primary Examiner.*